US010480634B2

United States Patent
Moetakef

(10) Patent No.: US 10,480,634 B2
(45) Date of Patent: Nov. 19, 2019

(54) COUNTERBALANCE GEAR FOR AN ENGINE

(71) Applicant: Ford Global Technologies, LLC, Dearborn, MI (US)

(72) Inventor: Mohammad Ali Moetakef, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 15/711,063

(22) Filed: Sep. 21, 2017

(65) Prior Publication Data
US 2019/0085966 A1   Mar. 21, 2019

(51) Int. Cl.
| | | |
|---|---|---|
| *F16H 55/06* | (2006.01) | |
| *F16F 15/28* | (2006.01) | |
| *F16H 1/06* | (2006.01) | |
| *F16H 55/14* | (2006.01) | |

(52) U.S. Cl.
CPC ........... *F16H 55/06* (2013.01); *F16F 15/283* (2013.01); *F16H 1/06* (2013.01); *F16H 55/14* (2013.01)

(58) Field of Classification Search
CPC ...... F16H 55/06; F16H 2055/185; F16H 1/06; F16H 55/14; F16F 15/283
See application file for complete search history.

(56) References Cited

U.S. PATENT DOCUMENTS

| | | | | |
|---|---|---|---|---|
| 719,572 | A * | 2/1903 | Evenden | F16H 1/06 29/893.1 |
| 1,085,420 | A * | 1/1914 | Hess | F16H 55/06 74/460 |
| 1,862,867 | A * | 6/1932 | Strauss | B60B 17/0003 295/22 |
| 2,093,420 | A * | 9/1937 | Creager | F16H 55/14 464/96 |
| 3,719,103 | A | 3/1973 | Streander | |
| 4,648,359 | A * | 3/1987 | Ito | F01L 1/02 123/192.2 |
| 5,160,771 | A | 11/1992 | Lambing et al. | |
| 5,852,951 | A | 12/1998 | Santi | |

FOREIGN PATENT DOCUMENTS

| | | |
|---|---|---|
| CN | 103671828 A | 3/2014 |
| DE | 10326819 A1 | 12/2004 |

* cited by examiner

*Primary Examiner* — Thomas C Diaz
(74) *Attorney, Agent, or Firm* — Brooks Kushman P.C.; Geoffrey Brumbaugh

(57) ABSTRACT

A gear train for an engine is provided with a driving gear and a driven gear. The driving gear is formed by a laminate structure of a plurality of plastic sheets and a plurality of metal sheets, with the plastic and metal sheets alternating with one another. The driven gear is formed by another laminate structure of another plurality of plastic sheets and another plurality of metal sheets, with the plastic and metal sheets alternating with one another. The gear train may be provided for use with an engine crankshaft and an associated balance shaft. A method of forming the gear is also provided.

13 Claims, 6 Drawing Sheets

COUNTERBALANCE GEAR FOR AN ENGINE

TECHNICAL FIELD

Various embodiments related to a gear such as a counterbalance gear on a counterbalance shaft for an engine.

BACKGROUND

Vehicles commonly use intermeshed gears to transmit torque or power in the vehicle, and to operate various vehicle systems or components. The vehicle is provided with an internal combustion engine and a transmission system, each of which may include intermeshing gears. Balance shafts, or counterbalance shafts, may be used with internal combustion engines to cancel unbalanced loads in the engine which are developed from engine operation. A gear train including intermeshed gears is commonly used to transfer rotation to the balance shaft, for example, from a crankshaft.

In conventional engine and counterbalance shaft systems, the intermeshed gears are provided by metal gears; however, these gears may provide limited damping, and the material stiffness properties may result in or be the source of tonal noise (whine), rattle, or other noise vibration and harshness (NVH). The gear-to-gear interaction may result in noise commonly referred to as gear whine. Gear whine is mainly due to the transmission error between meshing teeth of the two gears and may be dependent on several factors including torsional load, gear design, tooth profile, total number of teeth, number of contacting teeth, gear mass, and inertia. Gear whine may be increased in cases with high torsional excitations and may further increase at various orders or harmonics. Metal gears may result in high contact forces at the intermeshing gear teeth due to gear mesh frequencies and lead to whine. Additionally, gear teeth separations caused by gear backlash and the pulsation in the torque or load applied to the gear train may result in a rattling noise. Alternative materials for use in forming the intermeshed gears, such as a plastic, may be limited, based on the high level of torque fluctuations. For example, with a counterbalance shaft on an engine, the torque spikes may be as high as 150 N-m, and alternative materials may have insufficient durability for these applications.

SUMMARY

In an embodiment, an engine system is provided with a crankshaft gear coupled to an engine crankshaft for rotation therewith, and a balance gear coupled to a balance shaft for rotation therewith. The balance and crankshaft gears are in meshed engagement. The balance gear is formed from a plurality of layers of a first material and a plurality of layers of a second material, with the first and second material layers alternating with one another to form a laminate structure.

In another embodiment, a gear train for an engine is provided with a driving gear and a driven gear. The driving gear is formed by a laminate structure of a plurality of plastic sheets and a plurality of metal sheets, with the plastic and metal sheets alternating with one another. The driven gear is formed by another laminate structure of another plurality of plastic sheets and another plurality of metal sheets, with the plastic and metal sheets alternating with one another.

In yet another embodiment, a method of forming a gear for a vehicle shaft is provided. A series of plastic sheets are formed and extend from a central bore to a circumferential edge defining a series of teeth. A series of metal sheets are formed and extend from a central bore to a circumferential edge defining a series of teeth. The circumferential edge of each of the metal sheets matches the circumferential edge of each of the plastic sheets. The series of plastic sheets and the series of metal sheets are arranged such that plastic and metal sheets alternate with one another. The series of plastic sheets and the series of metal sheets are connected together to form a laminate gear.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
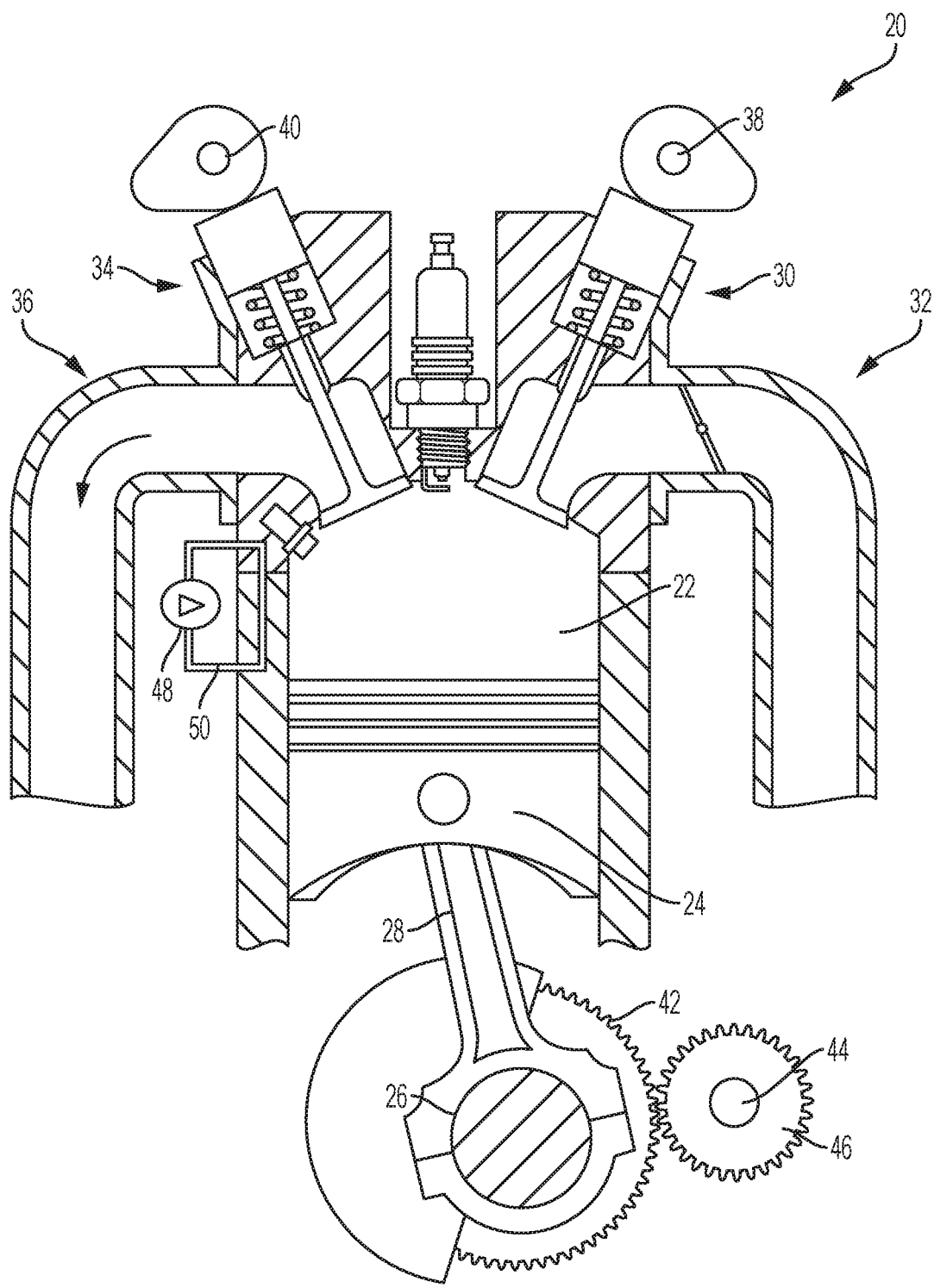
FIG. 1 illustrates a schematic of an internal combustion engine configured to implement various embodiments according to the present disclosure.

FIG. 1 illustrates a schematic of an internal combustion engine system 20 configured to implement various embodiments according to the present disclosure. In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

The engine 20 has a cylinder block and a cylinder head that cooperate to define a plurality of cylinders 22, with one cylinder is illustrated. The engine 20 may have one cylinder, two cylinders, three cylinders, four cylinders, or more than four cylinders. A piston 24 is positioned within each cylinder and is connected to a crankshaft 26 via a connecting rod 28.

One or more intake valves 30 controls flow from an intake manifold 32 into the cylinder 22. One or more exhaust valves 34 controls flow from the cylinder 22 to an exhaust manifold 36. The intake and exhaust valves 30, 34 may be operated in various ways as is known in the art to control the engine operation. The engine 20 is illustrated as having the intake valve 30 and exhaust valve 34 each with an associated camshaft 38, 40, respectively, in a direct overhead cam configuration. The engine and valves 30, 34 may be configured in various manners as is known in the art, for example, as a single overhead camshaft, dual overhead camshaft, direct camshaft actuation, an overhead valve configuration with the valves operated by pushrods or rockers, and the like. The camshafts 38, 40 may be rotationally connected to and driven by the crankshaft 26, and in one embodiment, are driven by a gear train according to the present disclosure as described below.

Each cylinder 22 may operate under a four-stroke cycle including an intake stroke, a compression stroke, an ignition stroke, and an exhaust stroke. In other embodiments, the engine may operate with a two stroke cycle. The piston 24 position at the top of the cylinder 22 is generally known as top dead center (TDC). The piston 24 position at the bottom of the cylinder is generally known as bottom dead center (BDC).

During the intake stroke, the intake valve(s) 30 opens and the exhaust valve(s) 34 closes while the piston 24 moves from the top of the cylinder 22 to the bottom of the cylinder 22 to introduce air from the intake manifold to the combustion chamber.

During the compression stroke, the intake and exhaust valves 30, 34 are closed. The piston 24 moves from the bottom towards the top of the cylinder 22 to compress the air within the combustion chamber.

Fuel is introduced into the combustion chamber and ignited. The engine may be provided as a spark ignition engine or as a compression ignition engine. During the expansion stroke, the ignited fuel air mixture in the combustion chamber expands, thereby causing the piston 24 to move from the top of the cylinder 22 to the bottom of the cylinder 22. The movement of the piston 24 causes a corresponding movement in crankshaft 26 and provides for a mechanical torque output from the engine 20.

During the exhaust stroke, the intake valve(s) 30 remains closed, and the exhaust valve(s) 34 opens. The piston 24 moves from the bottom of the cylinder to the top of the cylinder 22 to remove the exhaust gases and combustion products from the combustion chamber by reducing the volume of the chamber. The exhaust gases flow from the combustion cylinder 22 to the exhaust manifold 36.

The intake and exhaust valves 30, 34 positions and timing, as well as the fuel injection timing and ignition timing may be varied for the various engine strokes.

The crankshaft 26 may be provided with a crankshaft gear 42 or drive gear 42. A balance shaft 44 may be provided with a balance gear 46 or driven gear 46 in meshed engagement with the drive gear 42. The crankshaft 26 may have additional drive gears mounted thereon, or gear trains in meshed engagement with the drive gear to drive other engine or vehicle systems according to the present disclosure, including gear trains to drive the camshafts 38, 40, a pump 48 in a cooling or lubricating system 50 for the engine, a fuel pump, a supercharger or other forced induction system, a vacuum pump, an alternator, and the like.

Figure 2:
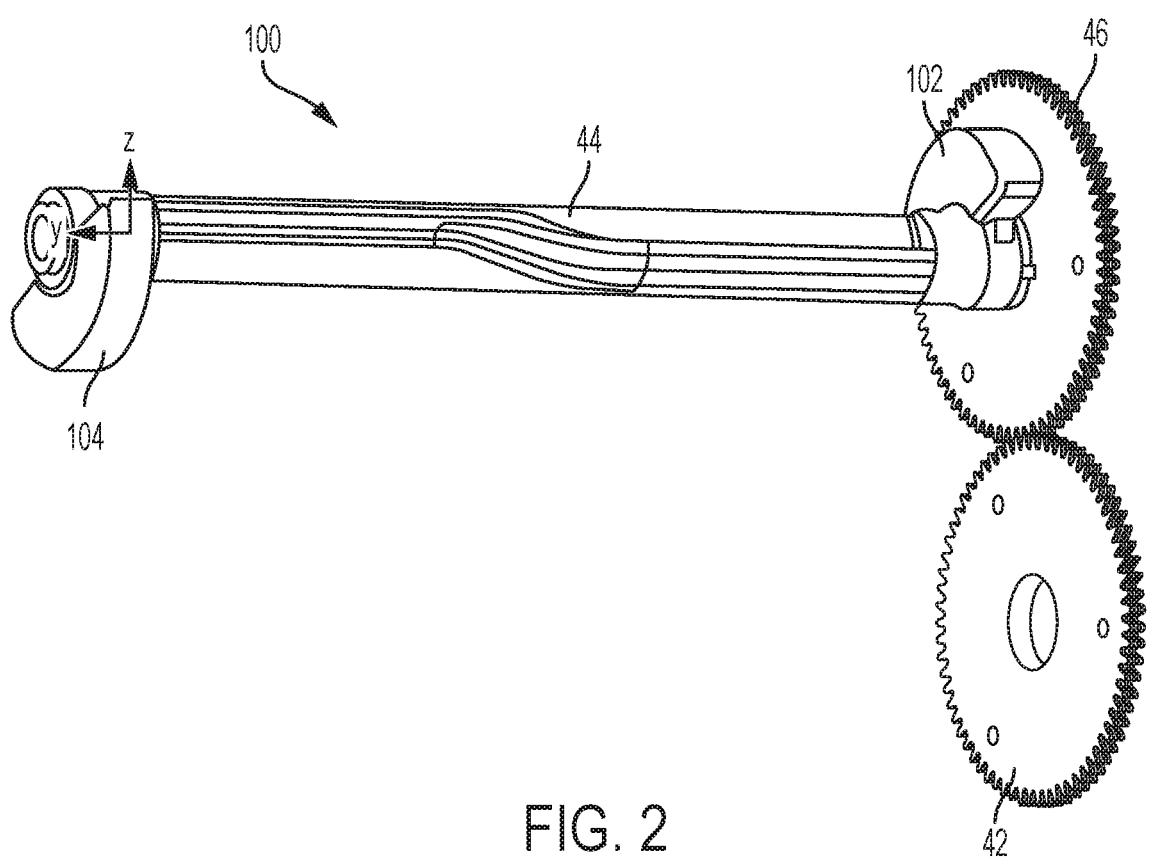
FIG. 2 illustrates a perspective view of a crankshaft and balance shaft assembly for use with the engine of FIG. 1.
Figure 3:
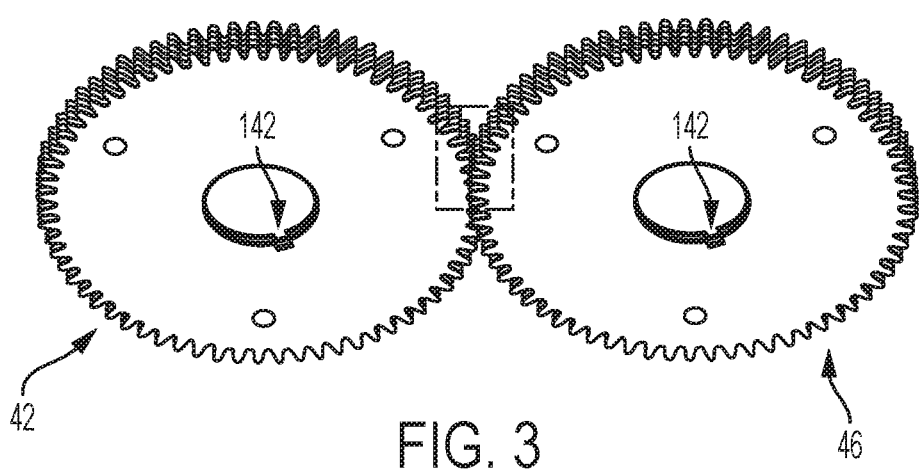
FIG. 3 illustrates a perspective view of a drive gear and a driven gear for use with the crankshaft and balance shaft assembly of FIG. 2 according to an embodiment.

FIG. 2 illustrates a perspective view of a balance shaft assembly 100 and crankshaft gear 42 according to an embodiment and for use with the engine 20 of FIG. 1. Elements in FIG. 2 have the same reference numbers as similar elements in FIG. 1 for simplicity. In other examples, the crankshaft and/or the engine may have more than one balance shaft. The balance shaft 44 may be provided for an engine with asymmetry. For example, in an engine with one or more cylinders, the movement of the pistons 24 and the connecting rods 28 may be asymmetrical throughout the crankshaft 26 rotation. For example, the descending and ascending pistons 24 are not always completely opposed or balanced in their movement and acceleration during a given period of crankshaft 26 rotation resulting in inertial forces and/or couples or moments with each crankshaft revolution that may additionally increase with increasing engine and crankshaft speed.

The crankshaft gear 42 or drive gear 42 couples to a crankshaft 26 for rotation therewith. The balance shaft 44 extends parallel to the crankshaft 26 and is eccentrically weighted. In one example, as shown, the balance shaft 44 has two eccentric counterweights 102, 104 or equal masses oriented at 180 degrees or opposite from each other, and placed at a specified distance from each other along the length of the balance shaft 44. In one example, the weights 102, 104 are formed as integral parts of the balance shaft 44, and in other examples, the weights 102, 104 that are connected to the balance shaft 44 for rotation therewith. The masses of the eccentric counterweights and their relative distance from one another depend on the level of the force or couple that needs to be balanced.

The balance shaft 44 has a driven gear 46 or balance gear connected thereto for rotation therewith. The drive gear 42 of the crankshaft is in meshed engagement with the driven gear 46 of a balance shaft such that rotation of the crankshaft 26 drives the balance shaft 44. The teeth of the drive gear 42 therefore interface or mesh with the teeth of the driven gear 46. The drive gear 42 and driven gear 46 may be selected to provide the desired gear ratio and speed ratio for the balance shaft compared to the crankshaft. In one example and as shown, the drive gear 42 and driven gear 46 are provided as intermeshed spur gears.

In a conventional system, the driven gear and the drive gear are provided by a conventional metal gears that are stiff and may lead to additional tonal noise (whine), rattle noise, and the like based on the contact forces between the gear teeth as well as the torque fluctuations that are input to the gear train. Replacing a conventional metal gear with a gear formed from a material with increased damping characteristics, such as a solid plastic gear, may not be an option for the system due to the high torque fluctuations and low durability of the material.

In the present disclosure, and as shown in FIG. 2 and described in greater detail below, the drive gear 42 and the driven gear 46 are each provided by a laminate gear structure or composite structure. The laminate structure is formed by alternating layers or sheets of a first material and a second material gear sheets which cooperate to form the laminate gear. The first material may be provided by metal, while the second material may be provided by a resilient material such as a plastic. In other examples, one of the drive gear and the driven gear is provided by a laminate structure while the other gear is provided as a conventional gear formed from a solid material. The laminate-structured drive gear and driven gear provide both the necessary strength and durability for the gear train as well as provide the improved damping characteristics to reduce NVH in the gear train.

FIGS. 3-6 illustrate an example of a drive gear 42 and driven gear 46 for use with the crankshaft 26 and balance shaft assembly 100 or with the engine 20 according to the present disclosure. Elements in FIGS. 3-6 are given the same reference numbers as similar elements in FIGS. 1-2 for simplicity. It is envisioned that the gears 42, 46 as described herein may be used as intermeshed gears in other vehicle applications to counteract gear-to-gear related NVH such as gear whine, rattle, and the like. Although the gears 42, 46 are shown as having the same or a similar diameter, the gears 42, 46 may be sized differently relative to one another to provide the desired gear ratio between the drive gear and the driven gear.

Figure 6:
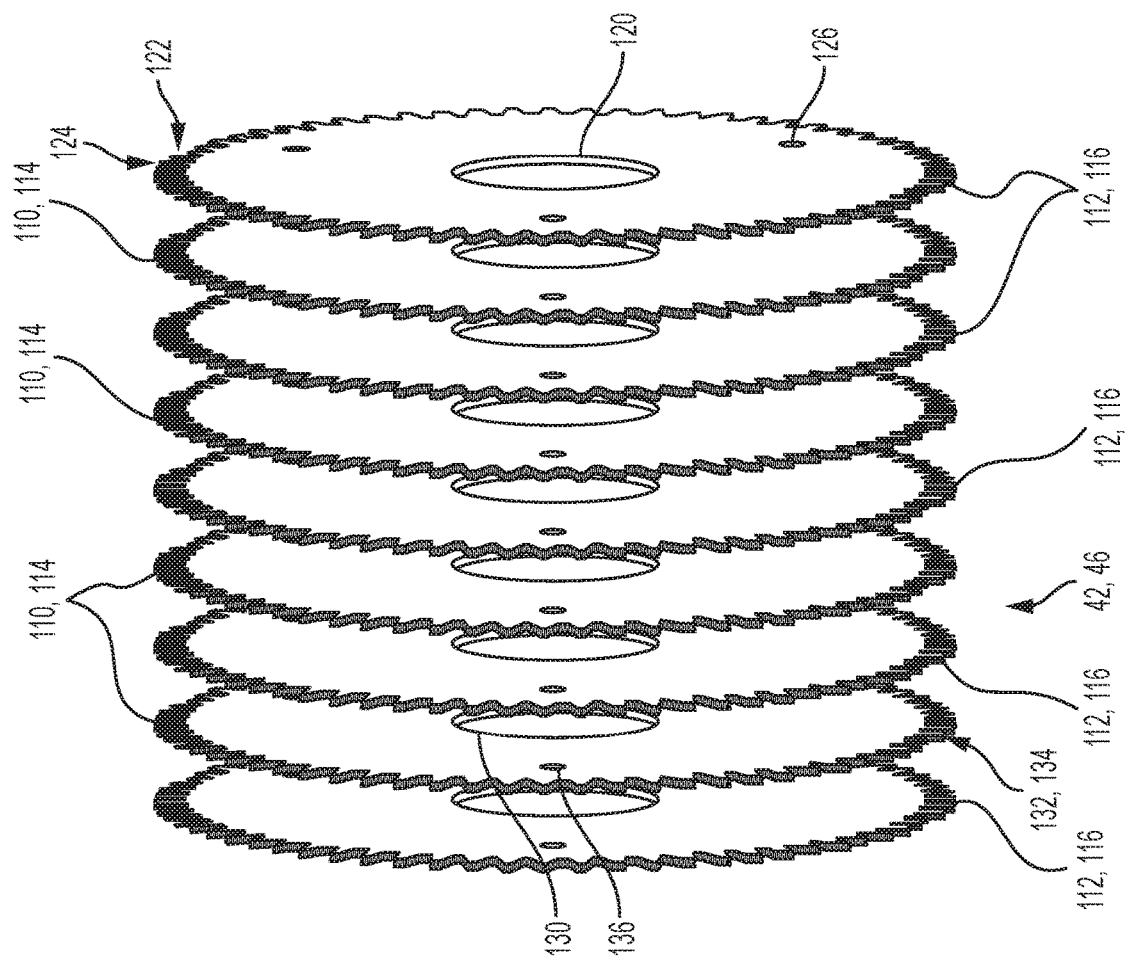
FIG. 6 illustrates an exploded view of the layers of the gear of FIG. 5.
Figure 5:
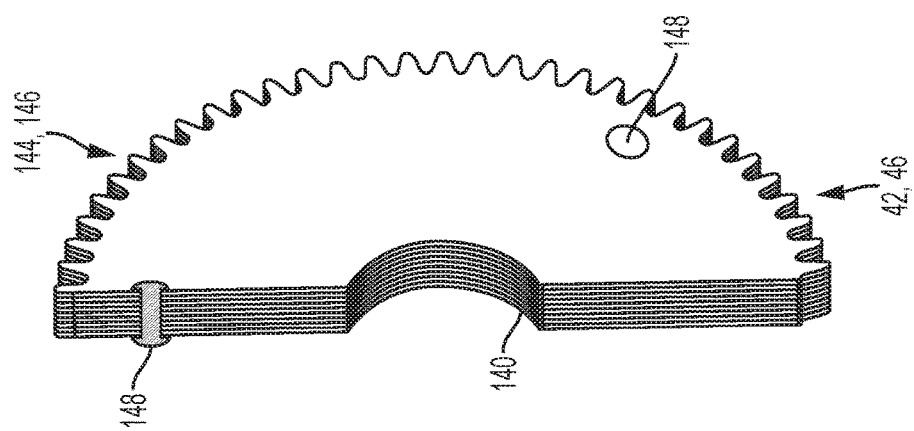
FIG. 5 illustrates a perspective sectional view of the drive gear or the driven gear of FIG. 3.

The driven gear 46, or balance gear 46, is formed as a laminate structure with alternating layers of material. The gear 46 is formed from a plurality of first material layers 110 or sheets 110 and another plurality of second material layers 112 or sheets 112, with the first and second layers 110, 112 alternating with one another to form the laminate structure. An exploded view of the laminate structure is shown in FIG. 6.

The drive gear 42, or crankshaft gear 42, is formed as a laminate structure with alternating layers of material. The gear 42 is formed from a plurality of first material layers 114 or sheets 114 and another plurality of second material layers 116 or sheets 116, with the first and second layers 114, 116 alternating with one another to form the laminate structure. An exploded view of the laminate structure is shown in FIG. 6.

The first material layers 110, 114 are each formed from a first material, and in one example, are formed from a metal or metal alloy such as steel.

The second material layers 112, 116 are each formed from a second material, and in one example, are formed from a plastic material including thermoplastic or thermoset. In non-limiting examples, the plastic material may be polyoxymethylene, polyphenylene sulfide (PPS), other high-performance plastic materials, and the like. The plastic materials may include fiber reinforcement or other filler materials. Additionally, the plastic may be selected to be dimensionally stable, and for thermal stability and chemical and wear resistance for use in harsh environments, e.g. an engine compartment with high temperatures and circulating lubricant. The plastic material may also be selected, for example, as a self-lubricating material to further reduce friction between the mating gear surfaces.

In the example shown in FIGS. 2-6, the metal layers 114 of the drive gear 42 interface with the metal layers 110 of the driven gear 46. The plastic layers 116 of the drive gear 42 interface with the plastic layers 112 of the driven gear 46. This causes a reduction in gear-related NVH based on the reduced metal-to-metal contact between the gears 42, 46 and the damping provided by the plastic-to-plastic interfaces of the aligned plastic layers 112, 116 of the gears.

The two outer layers of each gear 42, 46 may be provided by metal layers 110, 114 to provide increased mechanical stiffness and durability for the gears in use. For example, each of the driven gear 46 and drive gear 42 may be formed from (n) plastic sheets 112, 116 and (n+1) metal sheets 110, 114, with n being greater than two. In other examples, only one of the outer layers of each gear 42, 46 may be formed from a metal layer 110, 114 such that each of the drive gear and driven gear are formed from (n) plastic sheets 112, 116 and (n) metal sheets 110, 114, with n being greater than two. In a further example and as shown, each of the driven gear and drive gear may be formed from (n+1) plastic sheets 112, 116 and (n) metal sheets 110, 114, with n being greater than two, such that the plastic sheets 112, 116 form the outer layers for each gear 42, 46.

For each gear 42, 46, each plastic sheet or plastic layer 112, 116 is defined by a sheet of material extending radially outwardly from a central bore 120 to the outer perimeter 122 of the layer, with an edge region of the outer perimeter or circumferential edge defining a series of teeth 124. Each metal sheet or metal layer 110, 114 is defined by a sheet of material extending radially outwardly from a central bore 130 to the outer perimeter 132 of the layer, with an edge region of the outer perimeter or a circumferential edge defining a series of teeth 134. The central bores 120, 130 of each of the plastic layers and metal layers are the same and are configured to align with one another to form the central bore 140 of the laminated gear 42, 46. Note that a keyway 142 or other locating feature may be provided in the central bore 140. Likewise, the outer perimeter 122, 132 and series of teeth 124, 134 of each of the plastic layers and metal layers are the same such that they have a common outer perimeter 144, and are configured to align with one another and cooperate to form the series of teeth 146 for the laminate gear. The surfaces of the teeth of adjacent layers may be flush, aligned, or even with one another such that a continuous surface is provided for the gear teeth 146.

In one example, a thickness of each plastic sheet 112, 116 or plastic layer is greater than a thickness of each metal sheet 110, 114 or metal layer. For example, each of the plastic sheets 112, 116 of the driven and driving gear may have a first thickness, and each of the metal sheets 110, 114 of the driven and driving gear may have a second thickness that is less than the first thickness. According to an example, the metal sheets 110, 114 each have a thickness in the range of 1-2 millimeters and the plastic sheets 112, 116 each have a thickness of 2-6 millimeters, although other ranges are also envisioned. The plastic layers 112, 116 may be thicker to provide increased damping, while the metal layers 110, 114 are thinner to reduce weight while still providing the required stiffness and durability for the gears 42, 46.

In another example, the metal sheets 110, 114 and the plastic sheets 112, 116 may all be provided with the same thickness. In a further example, the thicknesses amongst the layers of each gear may vary relative to one another; however, the thicknesses of pairs of interfacing layers of the two intermeshed gears may be the same as one another.

The plastic and metal layers 110-116 for a gear each define a series of apertures 126, 136 therethrough, with the apertures 126, 136 of each layer aligned with one another. The series of apertures 126, 136 are positioned in an intermediate region of each layer between the central bore 120, 130 and the outer perimeter 122, 132, and are radially spaced around the layer. A series of fasteners 148 is provided with each fastener positioned through a respective one of the series of apertures 126, 136 to connect the layers together and form the laminate structure of the gear 42, 46. In various examples, the fasteners 148 may be provided by rivets, bolt and nut, or other mechanical fasteners. In further examples, the layers may additionally be connected to one another via an adhesive material positioned between adjacent layers.

Figure 7:
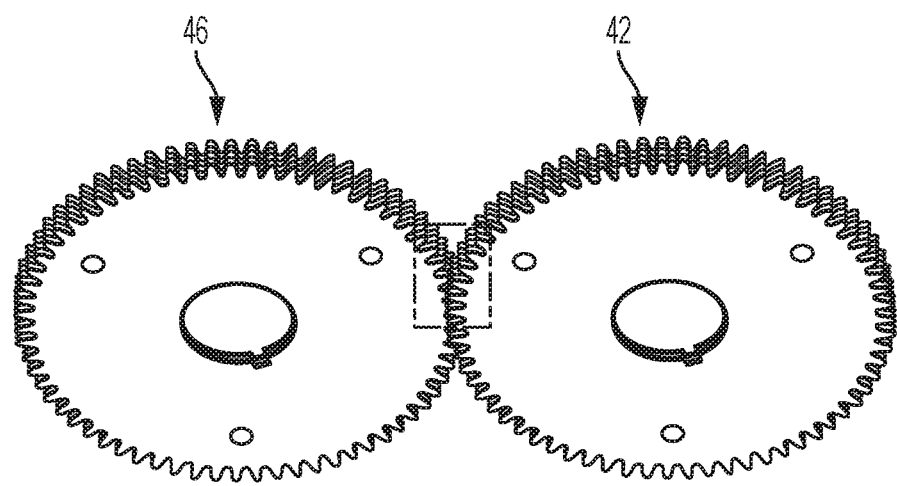
FIG. 7 illustrates a perspective view of a drive gear and a driven gear for use with the crankshaft and balance shaft assembly of FIG. 2 according to another embodiment.
Figure 8:
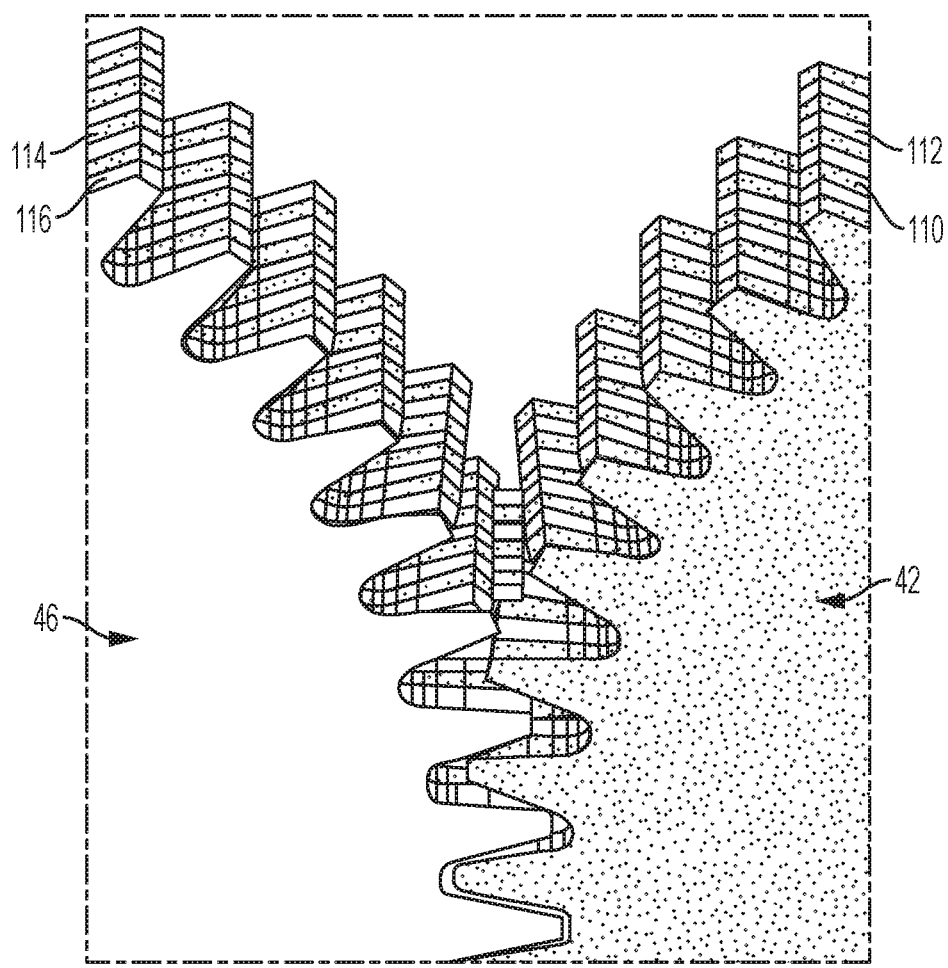
FIG. 8 illustrates a partial enlarged perspective view of the intermeshed teeth of the drive gear and the driven gear of FIG. 7.

FIGS. 7-8 illustrate another example of a drive gear 42 and driven gear 46 for use with the crankshaft 26 and balance shaft assembly 100 or with the engine 20 according to the present disclosure. Elements in FIGS. 7-8 are given the same reference numbers as similar elements in FIGS. 1-6 for simplicity, and the description above with respect to FIGS. 2-6 generally applies to FIGS. 7-8.

The drive gear 42 and the driven gear 46 may each be formed from (n) sheets or layers of a first material 110, 114 and (n) sheets or layers of a second material 112, 116. The plurality of first material layers 110, 114 may each be formed from metal. The plurality of second material layers 112, 116 may each be formed from plastic. The first and second layers 110-116 alternate with one another to form a laminate structure for each gear 42, 46.

In the example shown in FIGS. 7-8, the metal layers 110 of the drive gear 42 interface with the plastic layers 116 of the driven gear 46. The plastic layers 112 of the drive gear 42 interface with the metal layers 114 of the driven gear 46. This creates plastic-to-metal and metal-to-plastic interfaces between the gears 42, 46, in contrast to the metal-to-metal and plastic-to-plastic interfaces as described above with respect to FIGS. 2-6, and further reduces gear-related NVH based on the elimination of metal-to-metal contact between the meshed gears. In other words, the plurality of first material layers 110 of the drive gear 42 interface with the second material layers 116 of the driven gear 46, and the plurality of second material layers 112 of the drive gear 42 interface with the plurality of first material layers 114 of the driven gear 46.

In one example, the metal sheets 110, 114 and the plastic sheets 112, 116 may all be provided with the same thickness. In a further example, the thicknesses amongst the layers of each gear 42, 46 may vary relative to one another; however, the thicknesses of pairs of interfacing layers of the two intermeshed gears 42, 46 may be the same as one another.

Figure 4:
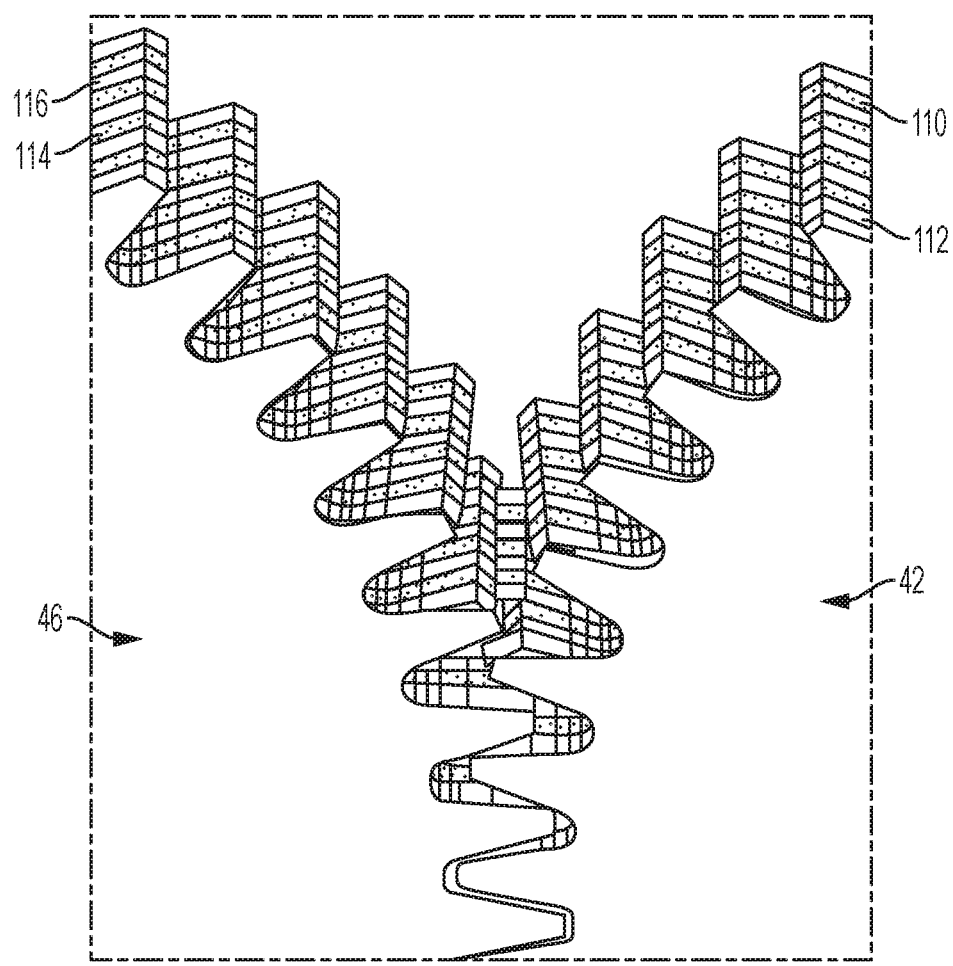
FIG. 4 illustrates a partial enlarged perspective view of the intermeshed teeth of the drive gear and the driven gear of FIG. 3.

In a further example, the drive gear 42 and driven gear 46 may each be provided with layers 110-116 arranged in a combination of the arrangements as shown in FIGS. 4 and 8 to include metal-to-metal, plastic-to-plastic, and metal-to-plastic and/or plastic-to-metal interfaces for the meshed gear teeth.

Figure 9:
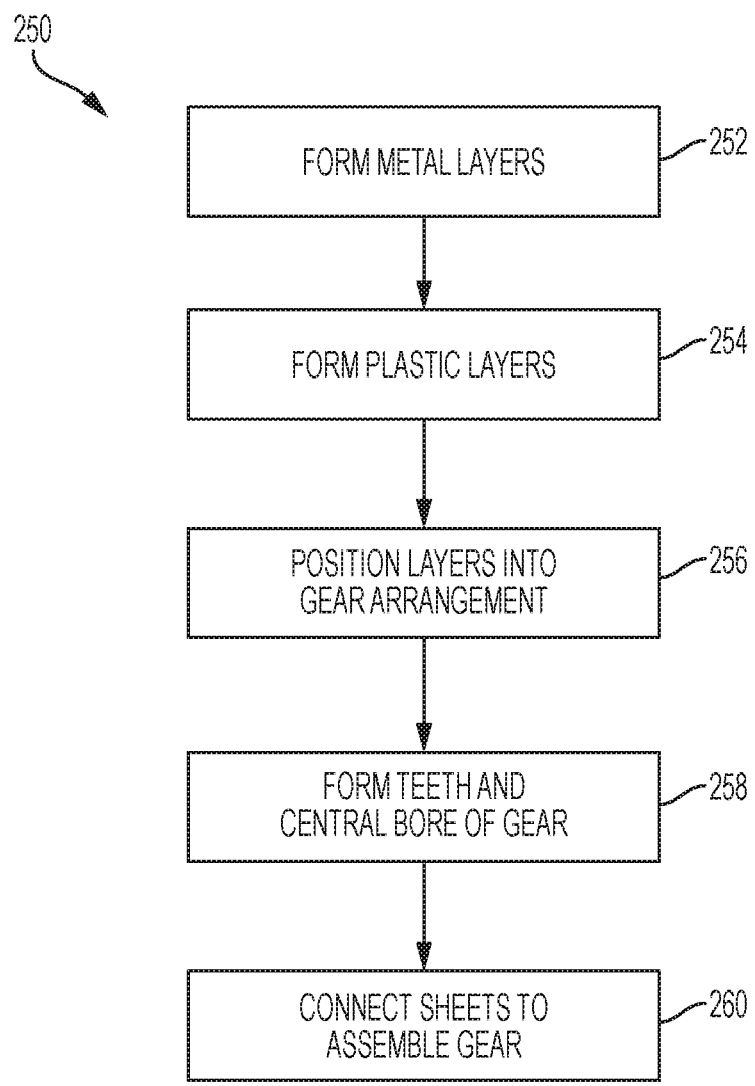
FIG. 9 illustrates a flow chart for a method of forming and arranging gears for a vehicle shaft assembly according to an embodiment.

FIG. 9 illustrates a flow chart of a method 200 according to an embodiment. The method includes forming a gear for a vehicle shaft. The method may have a greater or fewer number of steps than shown, and the steps may be rearranged to be performed in another order.

At step 252, a series of metal layers 110, 114 are formed for a gear 42, 46. The metal layers 110, 114 may be formed from a metal or a metal alloy. The metal layers may each be individually formed, for example, from powdered metal or using an electric discharge machining (EDM) technique. Alternatively, the metal layers for a gear may be formed as a larger blank, and then sliced or divided into the sheets.

At step 254 a series of plastic layers 112, 116 are formed for the gear 42, 46. The plastic layers may be individually molded or formed. Alternatively, the plastic layers for a gear may be formed as a larger blank, and then sliced or divided into the sheets.

At step 256, the metal and plastic layers are interlaced or arranged such that the plastic and metal layers alternate with one another. In one example, an adhesive material is placed between adjacent layers to aid in connecting the layers together and forming the gear 42, 46. In other examples, the gear is assembled without an adhesive.

At step 258, the central bore 120, 130 and the teeth 124, 134 for the gear are cut or otherwise formed into the stack of interlaced layers.

In other examples, the central bore 120, 130 and the teeth 124, 134 may be cut or formed into the materials separately and prior to interlacing the layers, or may be roughly formed prior to assembly with a fine machining or manufacturing process to follow. The teeth 124, 134 may be formed or further defined via machining, including gear cutting, hobbing, gear shaping, milling, or broaching, and may be heat treated or coated to increase wear resistance or reduce friction.

At step 260, the series of plastic sheets and the series of metal sheets are connected together to form a laminate gear 42, 46. In one example, a series of apertures 126, 136 is formed through each of the series of plastic layers and the series of metal layers, and the series of apertures of each layer are aligned with the apertures on adjacent layers. A fastener 148, such as a rivet, bolt-and-nut assembly, or the like is positioned through each of the series of apertures to connect the layers together and form the laminate structure for the gear.

These steps may be repeated to form the other of the drive gear 42 or the driven gear 46 for the gear train.

Various embodiments have associated non-limiting advantages. For example, a gear train for a balance shaft assembly is provided with a plastic-metal laminate gear. The metal layers provide durability for use in heavy torque transmission and high contact forces between gear meshes. Through the arrangement of the plastic and metal layers in the drive and driven gears, the metal-to-metal contact surface area may be reduced or eliminated and with the additional damping from the plastic layers may reduce NVH including rattle and whine noise. The plastic gear layers are stiffened by the adjacent metal gear layers. By using a laminate structured gear as described herein, NVH, including gear whine and rattle, may be controlled and mitigated at the source, e.g. the intermeshing gear teeth, while the gears retain the necessary stiffness and durability for a vehicle or balance shaft assembly application.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An engine system comprising:
   a crankshaft gear coupled to an engine crankshaft for rotation therewith; and
   a balance gear coupled to a balance shaft for rotation therewith, the balance and crankshaft gears in meshed engagement, the balance gear is formed from a plurality of layers of a first material and a plurality of layers of a second material, the first and second material layers alternating with one another to form a laminate structure;
   wherein each layer of the plurality of first material layers comprises metal;
   wherein each layer of the plurality of second material layers comprises plastic;
   wherein two layers of the plurality of second material layers are provided as outermost layers for the balance gear; and
   wherein each layer of the plurality of first material layers and the plurality of second material layers has a common outer perimeter.

2. The engine system of claim 1 wherein the crankshaft gear is formed from another plurality of layers of the first material and another plurality of layers of the second material, the another first and second material layers alternating with one another to form a laminate structure.

3. The engine system of claim 2 wherein the plurality of first material layers interface with the another plurality of second material layers; and
   wherein the plurality of second material layers interface with the another plurality of first material layers.

4. The engine system of claim 2 wherein the plurality of first material layers interface with the another plurality of first material layers; and wherein the plurality of second material layers interface with the another plurality of second material layers.

5. The engine system of claim 1 wherein a thickness of each layer of the plurality of second material layers is greater than a thickness of each layer of the plurality of first material layers.

6. The engine system of claim 1 wherein each layer of the plurality of first material layers and the plurality of second material layers is defined by a sheet extending radially outwardly from a central bore to the outer perimeter, an edge region of the outer perimeter defining a series of teeth.

7. The engine system of claim 1 wherein each layer of the plurality of first material layers and the plurality of second material layers defines a series of apertures therethrough, the apertures of each layer aligned with one another; and
wherein the balance gear comprises a series of fasteners, each fastener positioned through a respective one of the series of apertures.

8. A gear train for an engine, the gear train comprising:
a driving gear formed by a laminate structure of a plurality of plastic sheets and a plurality of metal sheets, the plastic and metal sheets alternating with one another; and
a driven gear formed by another laminate structure of another plurality of plastic sheets and another plurality of metal sheets, the plastic and metal sheets alternating with one another;
wherein the plurality of plastic sheets of the driving gear is provided by (n+1) sheets, and the plurality of metal sheets is provided by (n) sheets:
wherein the another plurality of plastic sheets of the driven gear is provided by (n+1) sheets, and the another plurality of metal sheets is provided by (n) sheets; and
wherein each sheet of the plurality of plastic sheets and the plurality of metal sheets of the driving gear share a common outer perimeter; and wherein each sheet of the another plurality of plastic sheets and the another plurality of metal sheets of the driven gear share a common outer perimeter.

9. The gear train of claim 8 wherein the plurality of metal sheets of the driving gear interface with the another plurality of metal sheets of the driven gear.

10. The gear train of claim 8 wherein each of the sheets of the plurality of plastic sheets and the another plurality of plastic sheets have a first thickness;
wherein each of the sheets of the plurality of metal sheets and the another plurality of metal sheets have a second thickness; and
wherein the second thickness is less than the first thickness.

11. The gear train of claim 8 wherein each sheet of the driving gear and the driven gear extends radially outwards from a central bore to a circumferential edge defining a series of teeth.

12. A gear train for an engine, the gear train comprising:
a driving gear formed by a laminate structure of a plurality of plastic sheets and a plurality of metal sheets, the plastic and metal sheets alternating with one another; and
a driven gear formed by another laminate structure of another plurality of plastic sheets and another plurality of metal sheets, the plastic and metal sheets alternating with one another;
wherein the plurality of plastic sheets of the driving gear is provided by (n) sheets, and the plurality of metal sheets is provided by (n) sheets; and
wherein the another plurality of plastic sheets of the driven gear is provided by (n) sheets, and the another plurality of metal sheets is provided by (n) sheets.

13. The gear train of claim 12 wherein the plurality of metal sheets of the driving gear interface with the another plurality of plastic sheets of the driven gear.

* * * * *